Patented Nov. 5, 1935

2,019,936

UNITED STATES PATENT OFFICE 2,019,936

CYCLO-PENTYL BARBITURIC ACIDS AND THEIR SALTS

Horace A. Shonle, Indianapolis, Ind., assignor to Eli Lilly and Company, Indianapolis, Ind., a corporation of Indiana No Drawing. Application August 19, 1929, Serial No. 387,084

6 Claims. (Cl. 260—33)

It is the main object of my invention to produce 5,5-di-aliphatic-substituted barbituric acids, and their salts, in which one substituent is a straight-chain aliphatic radical having five hydrogen atoms and no triple bonds, comprising the ethyl group and the allyl group, and the other substituent is the cyclo-pentyl group.

The specific claims of the present application are directed to cyclo-pentyl ethyl barbituric acid and its salts; but the broader claims include also cyclo-pentyl allyl barbituric acid and its salts, which latter acid and its salts are the subject-matter of specific claims of my Patent No. 1,998,101, granted April 16, 1935, on application Serial No. 593,201, filed February 15, 1932, as a continuation in part of this present application.

These new barbituric compounds, both the acids and their salts, all have pronounced hypnotic action when administered either orally or hypodermically, and can produce sleep in relatively small doses and with relatively low toxic effects. In addition, solutions of these salts are found to be suitable for intravenous injection, and when so injected are found to produce very satisfactory general anaesthesia. The doses needed for such general anaesthesia by intravenous injection of solutions of such salts are much smaller than is necessary by oral administration of either the acids or the salts; so that certain complications and after-effects attendant upon attempted general anaesthesia by such oral administration are avoided by such intravenous administration. Further, solutions of these salts are found suitable for rectal administration, producing various degrees of general anaesthesia.

These new barbituric acids and their salts may all be represented by the following formula:

(1) 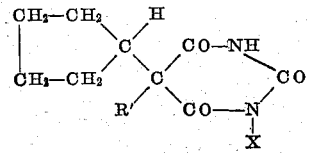

in which R' represents a straight-chain aliphatic radical having five hydrogen atoms and no triple bonds; and X represents either hydrogen, an alkali metal such as sodium, or its equivalent of an alkaline earth metal such as magnesium, or ammonium, or a mono- or di-alkyl-substituted ammonium, such as $-NH_3CH_3$ or $-NH_2(C_2H_5)_2$.

The various salts can perhaps best be prepared from the corresponding barbituric acids, as by a reaction in a suitable solvent with either the hydroxide or the ethylate of the desired inorganic base, or with ammonia, or with the desired organic base.

I will discuss separately the cyclo-pentyl ethyl barbituric compounds and the cyclo-pentyl allyl barbituric compounds.

Cyclo-pentyl ethyl barbituric compounds

The new cyclo-pentyl ethyl barbituric acid and its salts are all represented by the following formula:

(2) 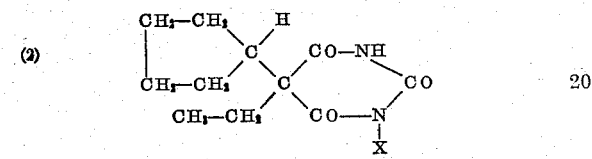

in which X represents either hydrogen (if the compound is an acid), or either an alkali metal, such as sodium, or the equivalent of an alkaline-earth metal, such as calcium, or ammonium, or a mono- or di-alkyl-substituted ammonium, such as $-NH_3-CH_3$ or $-NH_2(C_2H_5)_2$, (if the compound is a salt). Thus cyclo-pentyl ethyl barbituric acid has the formula:

(3) 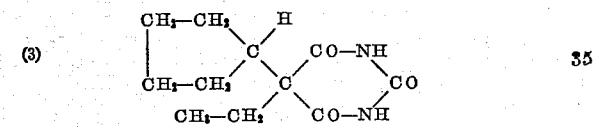

In preparing cyclo-pentyl ethyl barbituric acid, I first make cyclo-pentyl bromide from cyclo-pentanol. Then I preferably prepare cyclo-pentyl ethyl malonic ester from the cyclo-pentyl bromide and ethyl malonic ester. Then I prepare the desired cyclo-pentyl ethyl barbituric acid from the cyclo-pentyl ethyl malonic ester, by causing the latter to react with urea in the presence of sodium ethylate. Then, if desired, I may prepare barbiturates from the cyclo-pentyl ethyl barbituric acid, by reaction with a suitable base.

Cyclo-pentyl bromide

The cyclo-pentyl bromide is conveniently obtained by refluxing cyclo-pentanol with HBr.

Cyclo-pentyl ethyl malonic ester

Cyclo-pentyl ethyl malonic ester may be prepared as follows: 1 mole of sodium is dissolved in 10 or 12 times its weight of absolute alcohol under a reflux condenser. 1 mole of ethyl malonic ester (desirably ethyl di-ethyl malonate although either ethyl di-methyl malonate or ethyl di-propyl malonate may be used) is added; and then 1.1 moles of cyclo-pentyl bromide are added gradually. The mixture is refluxed for some hours, until it no longer shows an alkaline reaction to moist litmus paper. Most of the alcohol is removed by vacuum distillation, leaving an oily residue. Water is added to this residue to dissolve out the sodium bromide; and the oily layer, which is crude cyclo-pentyl ethyl malonic ester, is separated and dried. It is purified by fractional distillation in vacuo. It is a colorless or pale yellow liquid, having a boiling point of 123–124° C. at about 5 mm. pressure, and a refractive index at 25° C. o fbetween 1.4489 and 1.4498. It is represented by the following formula:

(4) 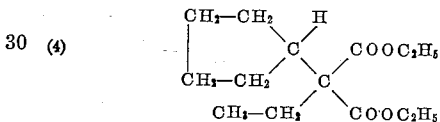

Cyclo-pentyl ethyl barbituric acid

Cyclo-pentyl ethyl barbituric acid may be prepared from cyclo-pentyl ethyl malonic ester as follows:

3 moles of sodium are dissolved in 10 or 12 times its weight of absolute alcohol under a reflux condenser. To this are added 1.6 moles of urea and 1 mole of cyclo-pentyl ethyl malonic ester. The mixture is gently refluxed for 12 to 15 hours, after which most of the alcohol is removed by vacuum distillation. The residue is dissolved in water, and a sufficient amount of dilute acid is added to completely precipitate the cyclo-pentyl ethyl barbituric acid. The precipitate is filtered off, dried, washed with gasoline, and recrystallized from dilute alcohol or benzene.

Cyclo-pentyl ethyl barbituric acid is a white crystalline solid, which melts at 181–183° C., corrected. It is represented by Formula 3 already given.

Barbiturates

Cyclo-pentyl ethyl barbituric acid forms barbiturates by reaction with suitable bases. These barbiturates are all represented by Formula 2, with X representing a metal, or ammonium, or an alkyl-substituted ammonium; and can best be prepared from the recrystallized cyclo-pentyl ethyl barbituric acid, as by reaction in a suitable solvent with either the hydroxide or the ethylate of the desired inorganic base, or with ammonia, or with the desired alkyl amine.

The sodium salt is a white solid, readily soluble in water and alcohol but insoluble in ether. The salts of ammonia, mono-methyl amine, and di-ethyl amine are whitish solids, soluble in water, which tend to lose their basic component when exposed to air. The magnesium salt is a white solid, less readily soluble in water than is the sodium salt.

*Alkali-metal salts.*—A solution of 1 molar proportion of the hydroxide or the ethylate of the inorganic base, such as sodium if an alkali-metal salt is desired, is added to a suspension or solution in a suitable solvent, alcohol for instance, of 1 molar proportion of the herein-contemplated cyclo-pentyl ethyl barbituric acid, to produce the desired sodium barbiturate in solution. The amount of solvent used is desirably sufficient to dissolve the salt thus produced. The solution is filtered; and is then evaporated, preferably under vacuum at low temperature, until the salt is obtained in solid form. If the salt is desired in a stable form sufficiently free from contaminants so that clear-water solutions suitable for intravenous injection may be obtained, it may be obtained by the method set forth in my Patent No. 1,856,792, granted May 3, 1932.

Sodium cyclo-pentyl ethyl barbiturate is represented by the following formula:

(5) 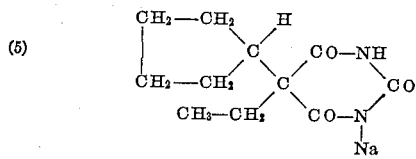

It is bitter-tasting, and its aqueous solution is alkaline in reaction. When $CO_2$ is bubbled through a concentrated aqueous solution of it, a precipitate of cyclo-pentyl ethyl barbituric acid appears. The aqueous solution of this sodium salt is not stable, but decomposes on standing.

*Ammonium salt.*—1 molar proportion of cyclo-pentyl ethyl barbituric acid may be dissolved in or added to more than a molar proportion of concentrated aqueous ammonia solution, and the resultant ammonium salt crystallizes out or is concentrated to solid form. The formula of this ammonium salt corresponds in general to Formula 5, for the sodium salt, save that $NH_4$ is substituted for Na.

*Alkyl-substituted-ammonium salts.*—1 molar proportion of cyclo-pentyl ethyl barbituric acid is added to somewhat more than a molar proportion of the desired organic base, such as mono- or di-methyl amine or mono- or di-ethyl amine, in aqueous or alcoholic solutions if desired or necessary. The amount of liquid used should be sufficient to ensure complete reaction. The resulting organic-base barbiturate crystallizes out or is concentrated to solid form. Too prolonged exposure to vacuum causes a loss of the amine, leaving the salt mixed with the free acid. The formulas of such organic-base barbiturates correspond in general to Formula 5, for the sodium salt, save that the substituted-ammonium radical, such for instance as the methyl-ammonium radical $-NH_3-CH_3$ or the di-ethyl-ammonium radical $-NH_2(C_2H_5)_2$, takes the place of Na.

The mono-methyl-ammonium salt of cyclo-pentyl ethyl barbituric acid is a whitish solid, soluble in alcohol and ether, soluble in water but less so than is the corresponding sodium salt, its aqueous solutions having an alkaline reaction. It should be kept tightly stoppered. It is represented by the following formula:

(6) 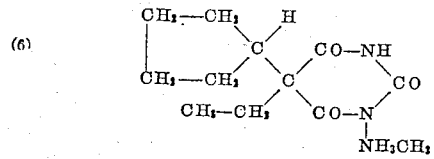

Cyclo-pentyl allyl barbituric compounds

The new cyclo-pentyl allyl barbituric acid and its salts are all represented by the following formula:

(7) 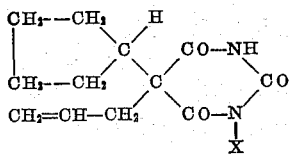

in which X has the same significance as before. Thus cyclo-pentyl allyl barbituric acid has the formula (8) 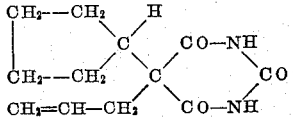

In preparing cyclo-pentyl allyl barbituric acid, I first make cyclo-pentyl bromide from cyclo-pentanol; as I do in preparing the cyclo-pentyl ethyl barbituric acid. Then I preferably prepare the mono-substituted cyclo-pentyl malonic ester from the cyclo-pentyl bromide and malonic ester. Then I prepare the mono-substituted cyclo-pentyl barbituric acid from the mono-substituted cyclo-pentyl malonic ester, by causing the latter to react with urea in the presence of sodium ethylate. Then I allylate this mono-substituted cyclo-pentyl barbituric acid, by causing it to react with allyl bromide in the presence of alkali, to produce the di-substituted cyclo-pentyl allyl barbituric acid. Then, if desired, I may prepare barbiturates from this di-substituted cyclo-pentyl allyl barbituric acid, by reaction with a suitable base.

Cyclo-pentyl malonic ester

Cyclo-pentyl malonic ester may be prepared from cyclo-pentyl bromide (obtained as before) analogously to cyclo-pentyl ethyl malonic ester, save that malonic ester (desirably di-ethyl malonate although either di-methyl malonate or di-propyl malonate may be used) is used instead of ethyl malonic ester. It is a colorless or pale yellow liquid, having when purified by fractional distillation in vacuo a boiling point of 113–115° C. at about 4 mm. pressure, and a refractive index at 25° C. of about 1.4420 to 1.4435. It is represented by the following formula:

(9) 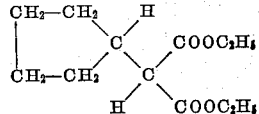

Cyclo-pentyl barbituric acid

Cyclo-pentyl barbituric acid may be prepared from cyclo-pentyl malonic ester as follows: 3 moles of sodium are dissolved in 10 to 12 times its weight of absolute alcohol under a reflux condenser. To this are added 1.6 moles of urea and 1 mole of cyclo-pentyl malonic ester. The mixture is gently refluxed for 2 to 4 hours, after which most of the alcohol is removed by vacuum distillation. The residue is dissolved in water, and a sufficient amount of dilute acid is added to precipitate the cyclo-pentyl barbituric acid. The precipitate is filtered off, dried, and recrystallized from dilute alcohol.

Cyclo-pentyl barbituric acid is a crystalline solid melting at 221–223° C., corrected. It is soluble in alcohol and ether, and insoluble in petroleum ether. It dissolves in aqueous solutions of the hydroxides of the alkali metals. It is represented by the following formula:

(10) 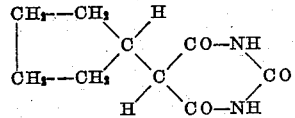

Its potassium salt is a white solid readily soluble in water and insoluble in ether.

Cyclo-pentyl allyl barbituric acid

Cyclo-pentyl allyl barbituric acid may be prepared from cyclo-pentyl barbituric acid, by causing it to react with allyl bromide; as follows: One mole of cyclo-pentyl barbituric acid is dissolved in a suitable vessel in a 25 to 35% aqueous solution of one mole of potassium hydroxide. To this are added somewhat in excess of one mole of allyl bromide, and alcohol equal to about 10% of the total volume of the solution. The vessel is agitated for 50–75 hours. At the end of this time, the solution, which still exhibits two layers, is concentrated to about one-half its volume, to remove the excess allyl bromide and the alcohol. On cooling, the cyclo-pentyl allyl barbituric acid separates out; and is dried, washed with petroleum ether, and dissolved in the minimum amount of benzene. Any unreacted cyclo-pentyl barbituric acid, which does not dissolve, is filtered off. The addition of petroleum ether to the clear filtrate causes the cyclo-pentyl allyl barbituric acid to precipitate. This precipitate is separated, washed with petroleum ether, and dried in vacuo.

Cyclo-pentyl allyl barbituric acid is a white crystalline solid, having a melting point of 162–164° C., corrected. It is represented by Formula 8 above.

Its sodium salt is a white solid, readily soluble in water and alcohol but insoluble in ether.

Barbiturates

Cyclo-pentyl allyl barbituric acid forms barbiturates analogously to cyclo-pentyl ethyl barbituric acid, by reaction with suitable bases. These barbiturates are all represented by Formula 7, with X representing a metal, or ammonium, or an alkyl-substituted ammonium.

I claim as my invention:

1. A barbituric compound which is represented by the following formula:

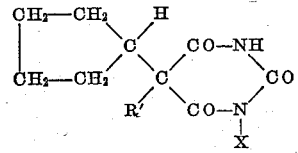

in which R' is a straight-chain aliphatic radical having five hydrogen atoms and no triple bonds, and X is either hydrogen, an alkali metal, ammonium, a mono- or di-alkyl-substituted ammonium, or an equivalent of an alkaline-earth metal.

2. A barbituric compound which is represented by the following formula:

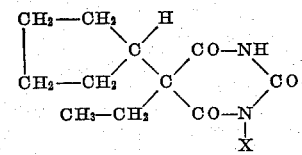

in which X is either hydrogen, an alkali metal, ammonium, a mono- or di-alkyl-substituted ammonium, or an equivalent of an alkaline-earth metal.

3. A soluble salt of the following composition:

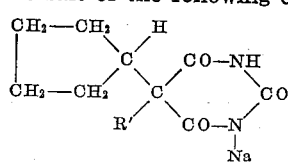

in which R' is a straight-chain aliphatic radical having five hydrogen atoms and no triple bonds.

4. A soluble salt of the following composition:

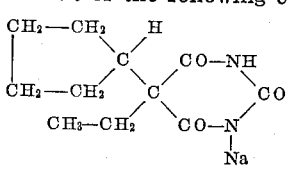

5. A barbituric acid which is represented by the following formula:

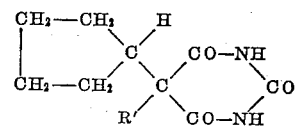

in which R' is a straight-chain aliphatic radical having five hydrogen atoms and no triple bonds.

6. Cyclo-pentyl ethyl barbituric acid, which is represented by the following formula:

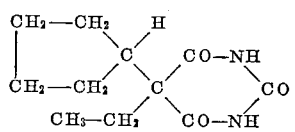

HORACE A. SHONLE.